(12) United States Patent
Costel

(10) Patent No.: US 7,658,282 B2
(45) Date of Patent: Feb. 9, 2010

(54) HOLDER FOR A DATA CARRIER

(76) Inventor: Linta Costel, Henri Duparcplantsoen 76, Den Haag (NL) NL-2551 XV ( * ) Notice: Subject to any disclaimer, the term of this patent is extended or adjusted under 35 U.S.C. 154(b) by 376 days.

(21) Appl. No.: 10/596,222

(22) PCT Filed: Dec. 4, 2004

(86) PCT No.: PCT/NL2004/000847

§ 371 (c)(1), (2), (4) Date: Jun. 5, 2006

(87) PCT Pub. No.: WO2005/059918

PCT Pub. Date: Jun. 30, 2005

(65) Prior Publication Data

US 2008/0283428 A1 Nov. 20, 2008

(30) Foreign Application Priority Data

Dec. 5, 2003 (NL) .................................. 1024956

(51) Int. Cl.
*B65D 85/30* (2006.01)
*A45C 13/10* (2006.01)

(52) U.S. Cl. .................. 206/308.1; 206/1.5; 206/308.2

(58) Field of Classification Search ................. 206/307, 206/308.1, 309
See application file for complete search history.

(56) References Cited

U.S. PATENT DOCUMENTS

| | | | | |
|---|---|---|---|---|
| 4,746,013 A | * | 5/1988 | Suzuki et al. ............... | 206/309 |
| 5,011,010 A | * | 4/1991 | Francis et al. ............... | 206/307 |
| 5,033,634 A | * | 7/1991 | Batchelor et al. ........... | 220/281 |
| 5,322,162 A | * | 6/1994 | Melk .......................... | 206/310 |
| 5,366,073 A | | 11/1994 | Turrentine et al. | |
| 5,445,265 A | | 8/1995 | Herr et al. | |
| 5,533,615 A | * | 7/1996 | McCamy .................. | 206/308.1 |
| 5,682,910 A | * | 11/1997 | Kizawa et al. ............... | 132/293 |
| 5,690,218 A | * | 11/1997 | McCamy et al. ............ | 206/303 |
| 5,715,938 A | * | 2/1998 | Cheris et al. ............. | 206/308.1 |
| 5,746,314 A | | 5/1998 | Knutsen et al. | |
| 5,779,038 A | | 7/1998 | Herr et al. | |
| 5,842,563 A | | 12/1998 | Herr et al. | |
| 5,906,274 A | * | 5/1999 | McEwan .................. | 206/308.1 |
| 5,938,020 A | * | 8/1999 | Luckow .................... | 206/308.1 |
| 6,056,117 A | * | 5/2000 | Courchesne ............. | 206/308.1 |

(Continued)

FOREIGN PATENT DOCUMENTS

WO    98/14391 A    4/1998

*Primary Examiner*—Ehud Gartenberg
*Assistant Examiner*—Jose S Stephens, III
(74) *Attorney, Agent, or Firm*—Brooks Kushman P.C.

(57) ABSTRACT

The invention includes at least one bottom side and a topside, with a insert-space in between, also including sides, which connecting the topside with the bottom side. Such a holder is general known and is being used to put away, for example a disc-shape data carrier, like a CD or a DVA, as also for magnetic data carriers, like a tape. The holder can be held by a user and he can use the nearby the hinge axis placed button, so the cover part of the holder part will be released. When the holder is placed on a horizontal supporting surface, the data carrier will be slanting placed in to the holder. Application of clip means for the data carrier is not necessary.

12 Claims, 5 Drawing Sheets

Figure 1:
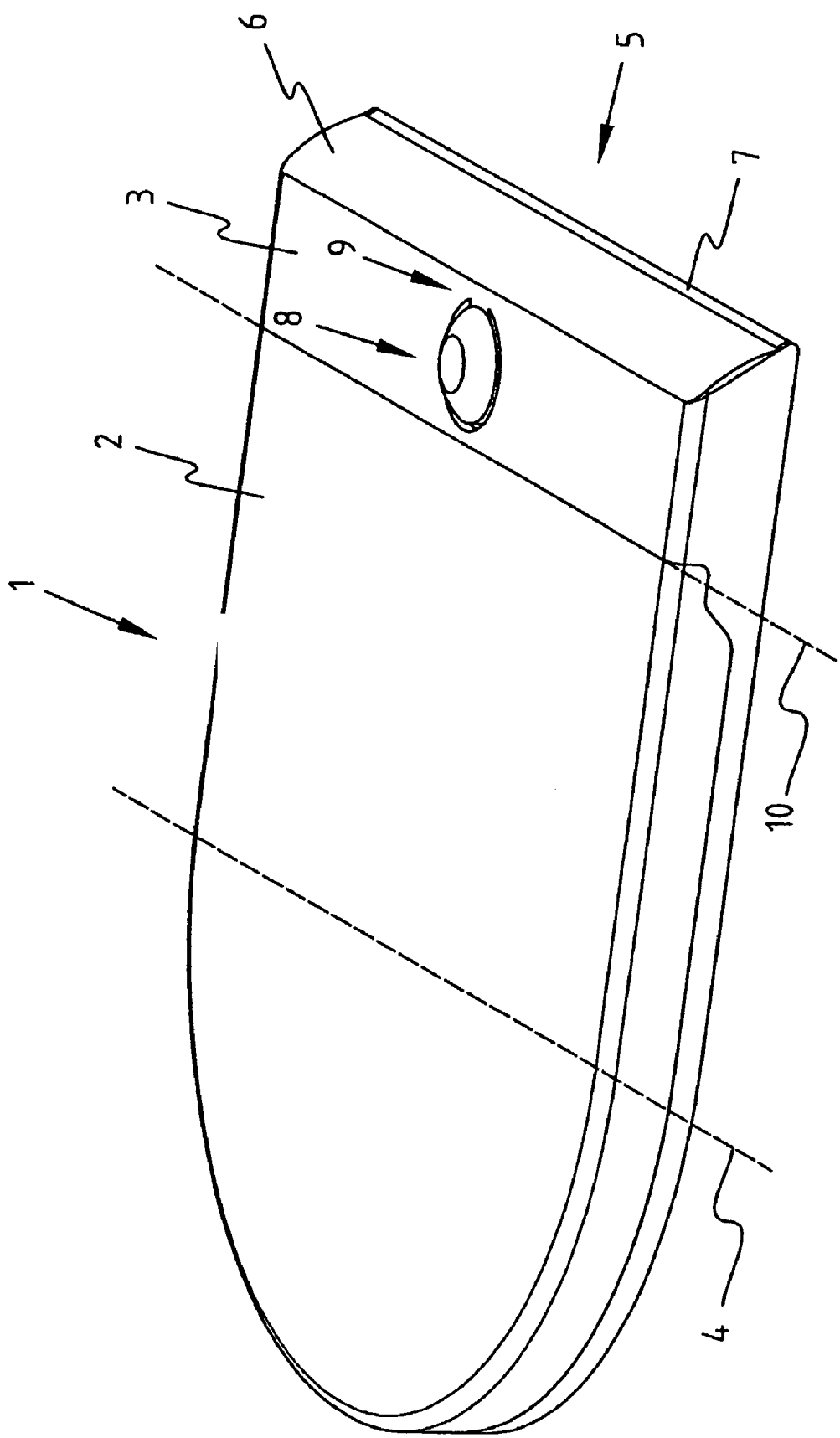

U.S. PATENT DOCUMENTS 6,170,657 B1 * 1/2001 Allsop et al. ............. 206/308.1
6,450,332 B1 * 9/2002 Courchesne ............. 206/308.1
6,786,332 B1 * 9/2004 Patrick et al. ............... 206/305

* cited by examiner

HOLDER FOR A DATA CARRIER

The invention concerns a holder for a data carrier, consisting of at least one bottom side and one topside, with between those two a lift up space, and fitted with sides, which connects the topside and the bottom side. A holder like this is in general known and being used for putting away for example a disc form data carrier, like a CD or DVD, as also like for magnetic data carrier, like a tape.

Such holders can sometimes be piled up or placed in a rack in a pile above each other held up together. From the piled up holders there only can be seen one side, the top- and bottom side are covered up with the top and underneath placed holders. The visible side is provided with information which is concerning the data carrier which can be put inside. A purpose of the invention is to make the side better visible. In a few cases the side is provided of information which will be better visible by this way.

This purpose will be reached because one part of at least one side of the holder is placed in an angle between 10° en 80° in relation to the bottom side. One side has a slant part. Therefore one side is sloping and is put in a rising angle between topside and bottom side, therefore this side is better shown from the angle of which is looked to the holder in the rack, besides of that the surface of the side will enlarge, depending on the angle, as a result of that more text can be shown. The side is no longer the shortest connecting line between the topside and bottom side. At least one part of the side is placed in an angle between 10° and 80° with the shortest connection between top- and bottom side.

In the preferential design at least a part of one side of the holder is placed in an angle between 10° and 80° with the topside Preferred is that the part of the side is placed in an angle of more than 20° with the bottom side, and in another preferential design is that a part of the side is placed in an angle less than 70° with the bottom side.

Because of that the surface of the side will enlarge more, because of that more information can be shown when the holder is piled up.

It is positive when the connection made through the side between top- and bottom side is at least partial spherical in cross-section. Because of the spherical form the connecting side between the top- and the bottom side will be longer. The side is not the shortest connecting line between top- and bottom side. Because of that more information can be shown. The side is for example spherical or has a spherical part.

Preferred is that at least one side includes in cross-section a spherical transparent material. The side connecting the top- with bottom side is at the outside of the holder spherical. Because of this a visual effect will be create were the information behind the side will be increased. The spherical, transparent material has the function of a lens, specially an enlargement effect.

In a further preferential design the holder includes grip points at, at least one part of the edge of at least one side, for gripping of the spherical, transparent material.

The spherical transparent material with the lens function can be separated from the holder an can be attached to the holder by means of grip points. The spherical transparent material is a strip which can be placed on the side. The grip point is, for example, a hook placed beside an edge. There can be 3 hook-shape edges which hold the lens-like part. One hook-like part grips to the upper part of the transparent spherical material.

Preferred the holder includes at least one cover part provided with the topside and a holder part provided with the bottom side, at which the top- and bottom side forms mainly parallel surfaces. Because of this a holder is created which is easily piled up, because the surfaces runs parallel.

It is positive to connect the cover part hinged with the holder part. Because of this the cover part can swerve around the hinge axis. By swerving of the cover- and holder part an access will be created to the take up space between the cover part and the holder part.

Preferably the transparent side, like described above, runs slanting between top- and bottom side, mainly nearby an axis of the hinge connection and runs mainly parallel to that axis. The transparent side forms, so to speak the backside of the holder, along which the holder can be opened. It is common to use the side for showing information. Preferably the holder is provided with at least one lock system, preferably formed by at least one hook attached to the cover part and at least one strip attached to the holder part, where the hook can gear into each other. Such clasp is easy to manufacture. The hook and strip can be formed by injection moulding of the cover part respectively the holder part. In another preferential design the hook or the strip is a part which can be separately attached to the cover part or to the holder part, for example of another material, for example of steel. The holder part and the cover part will include preferably a plastic, and will preferential manufactured by means of injection moulding.

In a preferential design the strip includes a flexible material. Because of that the strip is not retaining its form, but flexible with pre-stress, and can be moved with regard to the hook. When the lock system is closed, the strip can be flexible bend away, so the hook will disconnect.

Preferably the holder includes a using element which is connected to the strip, so that handling of the handlings element result in the flexible movement of the strip in gear with the hook. Because of that the locking mechanism can be unlocked by means of the handling element, and the holder can be opened. When opened the insert-space for the data carrier is accessible.

Preferably the handling mechanism includes a movable button in the holder. The button can be pushed so handling is easy.

Preferably the button is placed near by the hinge axis and the lock mechanism is placed nearby the side, which is at the opposite side of the holder. Because of that the holder can be held by a user, and the button can be used, while the user holds the holder part and the cover part opens freely from the holder part, by un-locking of the locking mechanism by pushing the button.

Preferably the holder part includes a stretched thread, connected to the strip, and the button touches the thread. By pushing the button, the button will moves down into the holder, the thread will be pushed, and will be tighten because of that. When the thread has no flexibility, the flexible strip will be pulled by the thread and will unlock the grip with the hook.

In a preferential design the holder includes two locks and the thread is connected with two strips. So a good lock will be ensured, which will not jump open easily, but can be unlocked effectively by handling the handlings element.

Preferably the holder has a closed condition, by which the bottom side and topside of the holder are parallel surfaces, and a open condition, by which the top- and the bottom side are moved away. In a preferential design is a flexible pre-stressed material put in between the cover part and the holder part, by which the open condition is the pre-stressed condition. Because of that, when the lock will be unlocked, the holder will move to the pre-stressed condition, by which the holder will be opened. The holder can be handled with one hand. In the pre-stressed condition the top- and bottom side are preferable mainly at right angles to each other.

In a preferential design the flexible material is a steel thread. The thread is fixed connected to the holder part and the cover part and is pre-stressed so holder and cover part will move away from each other.

It is positive the insert-space of the holder to provide of position-additions for data carrier, which will fix a supporting surface for the data carrier, which is in a slanting way to the bottom side. Because of that the data carrier is placed in a slanting position to the bottom side. Preferably the supporting surface is placed in an angle between 1° and 20° with the bottom side. When the bottom side of the holder is placed on a flat supporting surface, for instance a table, the data carrier is slanting to place in the holder. Using clips for the data carrier are not necessary.

Preferably the position means includes an edge, to grip at least one part of outline of the data carrier. Because of that a part of the outline of the data carrier is being gripped and the data carrier, when placed into the holder, is positioned. The data carrier can be placed in the holder in a slanting way preferably with the lowest part nearby the hinge axis of the holder. The gripping edge of the holder part is also nearby the hinge axis. The data carrier can be placed slanting into the direction of the hinge axis when looking from above.

Preferably the holder part of the holder includes an edge, which is a C-shape or a U-shape in cross-section and which is developed for gripping a curve-shape outline of a data carrier. The data carrier is preferably a CD or a DVD. The outline can be placed into the C-shape edge and will be partly inserted. Preferably the outline will be gripped near the edge at both sides of the data carrier, by means of a non-scraping surface, by which damage of the data carrier will be prevented. Preferably the outline will be clipped into the edge. Because of that the data carrier will be positioned in a fixed way into the holder. Because of that there will be no needs for further fixing means, like flexible means which grip to a gap of the data carrier. This way of gripping is especially positive for disabled users.

In a further preferential means the holder is made up by a beam shape part and a mainly taco-shape part. Because of that the holder is mainly an arch-shape or a D-shape. The holder has a shape which has partly the shape of the round data carrier and which follows that shape. The usual beam-shape holder becomes according to the invention a holder with rounded sides. Preferably the sides across the hinge of the holder will be round off. Because of that the holder is easy to hold by a user. A holder is also in accordance with the invention easy to place in a rack to pile up holders. Because of the fact that the holder is fitted with round sides, this will be easy to place in the pile up space of a rack.

Figure 2:
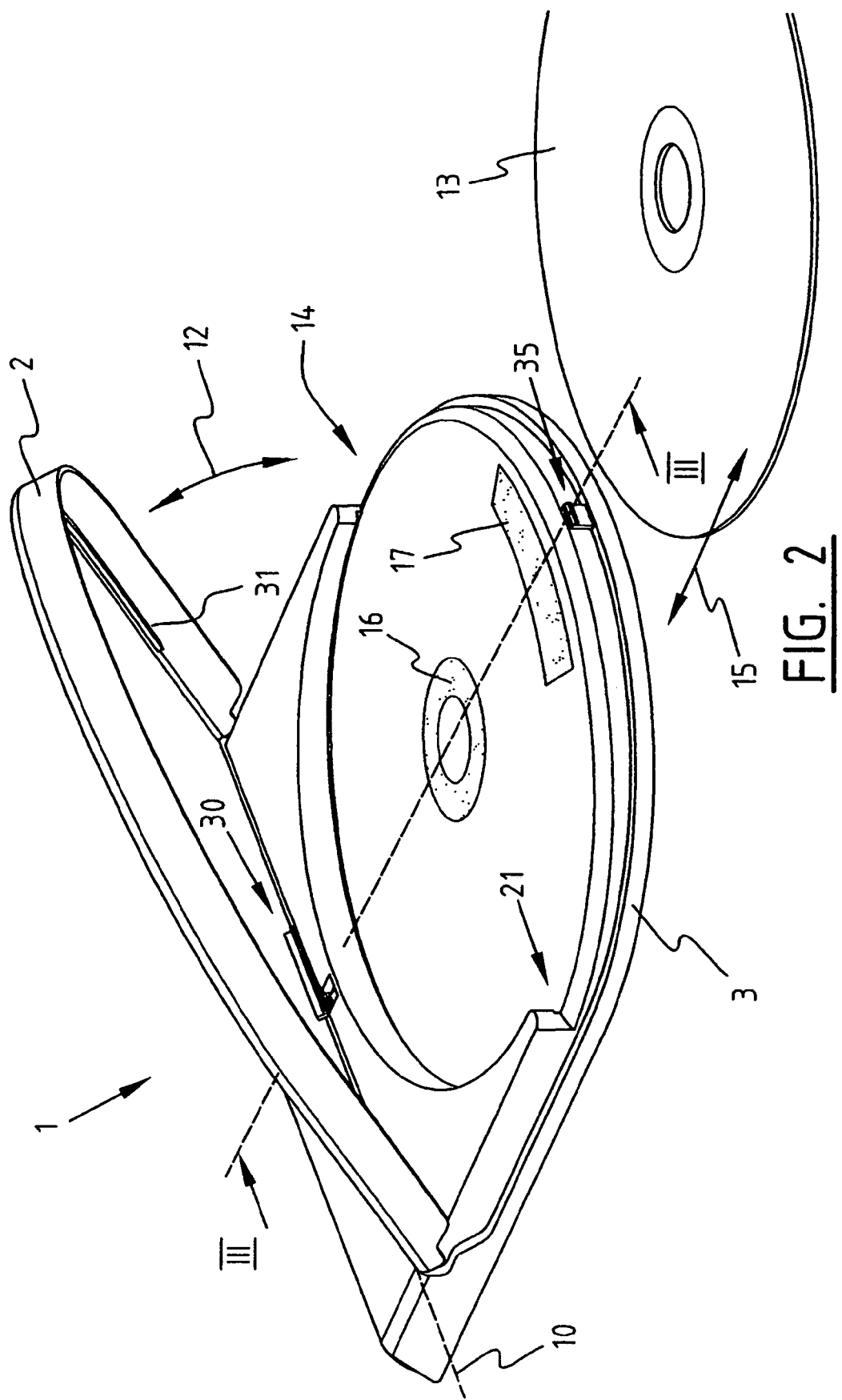
Figure 3:
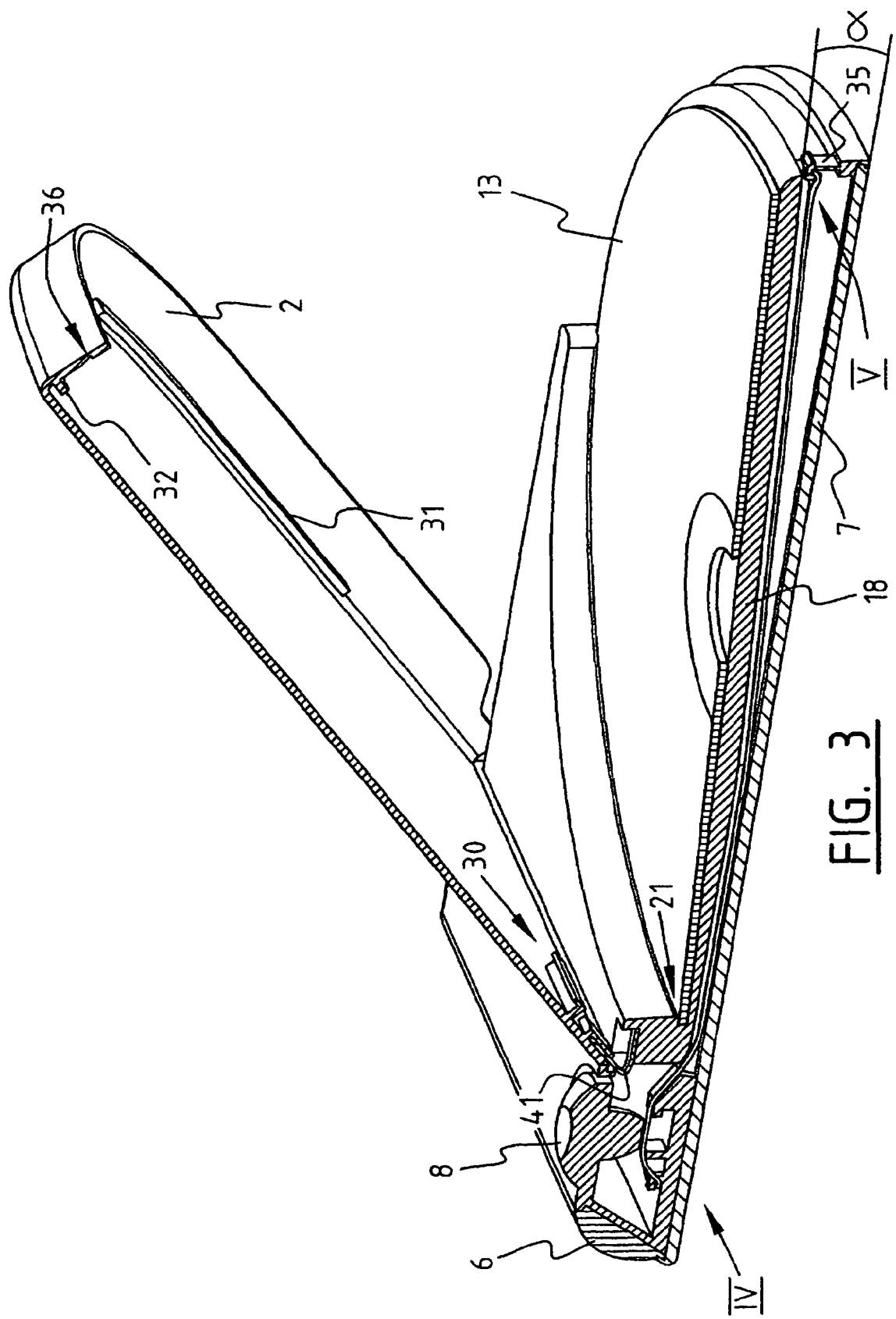
Figure 5:
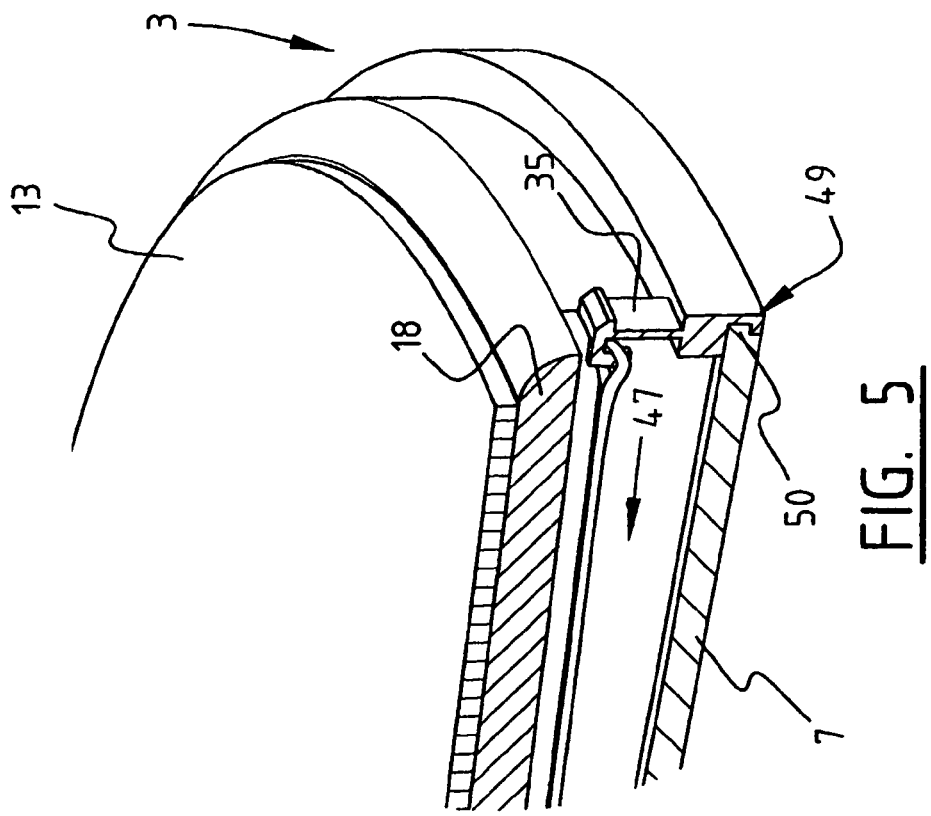
Figure 4:
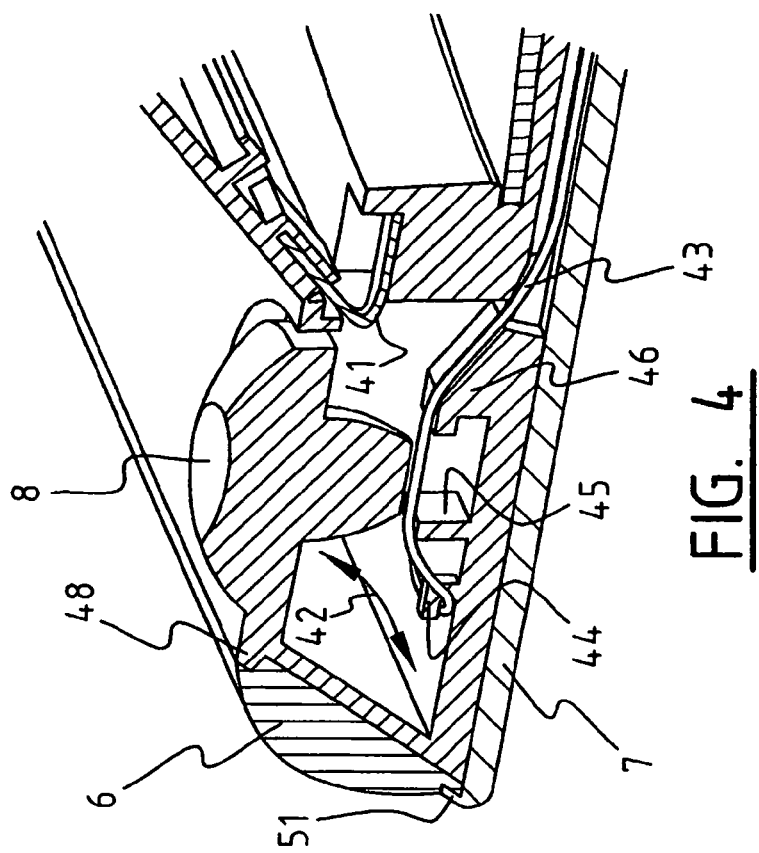
Figure 6:
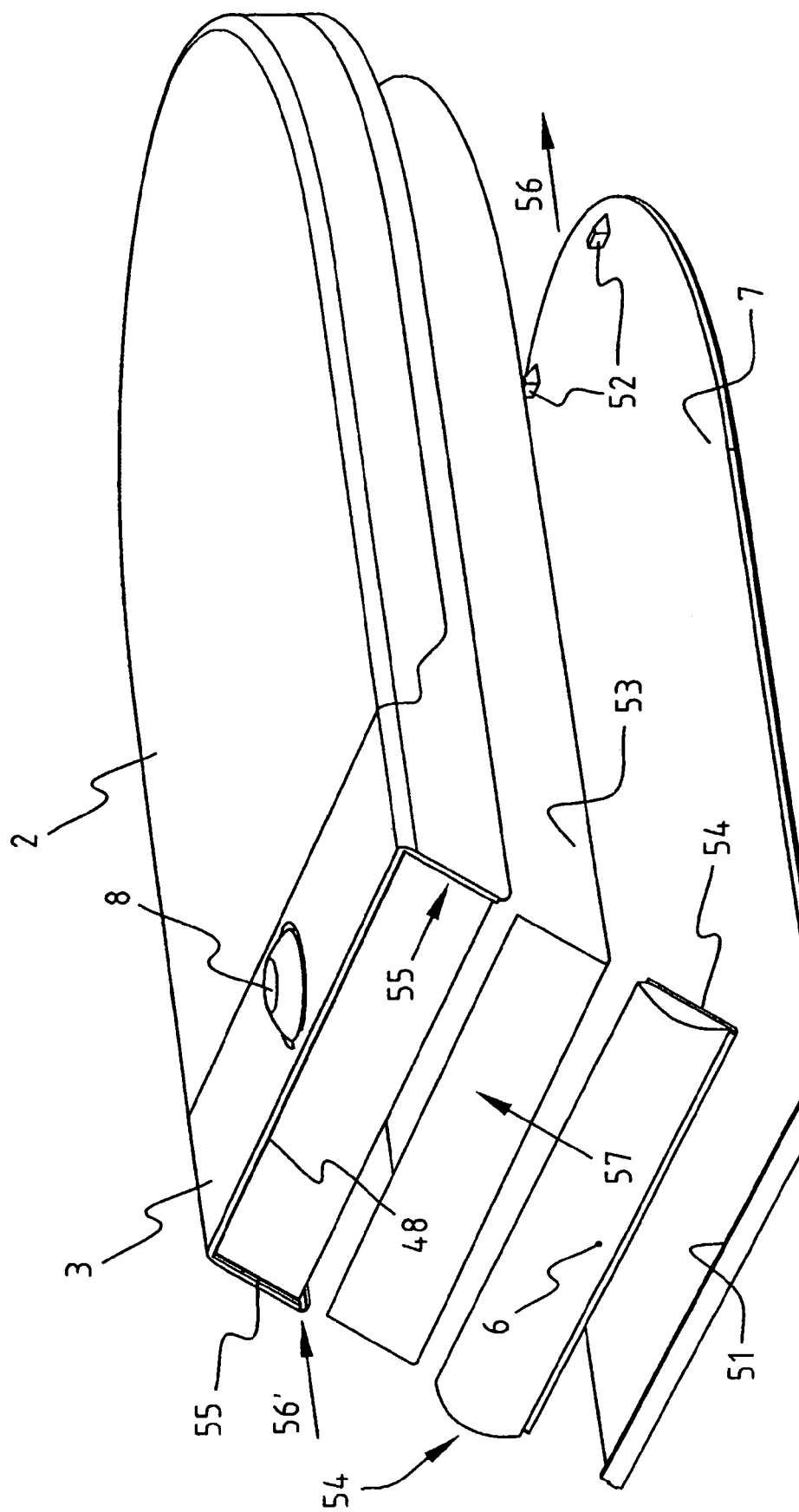

The invention will be described further by means of the added drawings, in which:

FIG. 1 shows perspective point of view of the holder in accordance with a first design of the invention in a closed state, FIG. 2 shows perspective point of view of the holder in accordance with the invention in an open state, FIG. 3 shows perspective point of view in cross-section of the holder in accordance with a first design of the invention between line III-III in 25 FIG. 2, FIGS. 4 and 5 shows details of the holder of FIG. 3 in accordance IV respectively V, FIG. 6 shows a perspective point of view of the holder in accordance a second design.

The holder 1 in FIG. 1 is shown in closed state. The holder 1 has an arch-shape or a D-shape. Shown is a view at the topside of holder 1. The topside has a mainly arch-shape. The topside has mainly a straight edge and two mainly in a right angle placed edges which bend to each other at the end, because of that a arch-shape arises at the end. The mainly straight edge form the back of the hinging holder 1.

The holder 1 according to FIG. 1 is suitable to insert mainly round-shape/disc-shape data carriers 13, like CD's and DVD's.

The topside is made by the top of the cover side 2, and a towards the topside sticking out part of holder part 3. Cover side 2 and holder part 3 of the holder 1 has the same mainly arch-shape of the complete holder. The edges of the composite holder are all rounded. There are no sharp edges. Because of that, a user of the holder 1 cannot be injured by gripping of the holder 1.

In the surface of holder part 3, a button 8 is put in on the topside of holder 1. The cover part 2 and holder part 3 can be formed by injection moulding of plastic. The push-button 8 can be formed in the hard part 3 then, after hardening, the space around the push-button 8 can be sawn away. In this way the push-button 8 is connected through the holder part 3 by means of a strip 9, and it is possible to move this partially to bottom direction, especially to let it swerve around the strip 9. The flexible plastic material of the holder part 3 keeps the push-button on his place. Axis 10 is a hinge-axis which connects cover part 2 with holder part 3. The hinge can be designed by different ways. Preferably the hinge will be located nearby the top side of holder 1.

In a preferential design holder part and cover part are formed by means of injection moulding. The parts are connected to each other by a thin strip of material. The thin strip (shown in FIG. 4) forms the hinge. In another preferential design the hinge is formed by design of a hinging part which grips to the two parts. Preferably the hinge will be formed by two ridges which stick inside of the inside of the cover part 2, and which will be taken up in similar savings, which are put in to holder part 3. Such a hinge is to manufacture by forming the respectively parts similar.

FIG. 2 shows the holder 1 in a opened state. The cover part 2 can swerve around hinge-axis 10 according to arrow 12. Topside and bottom side of the holder 1 are moved away from each other in shown state. The distance between the cover part and the holder part is enlarged. The opened state according to FIG. 2 makes it possible a data carrier, like a CD or a DVD 13, to put in the insert-space 13 which is between the topside and the bottom side of the holder 1. The insert-space 14 will be accessible by releasing the cover part 2 of the holder part 3. This will be spoken more in detail later on.

The disc-shape data carrier 13 can be placed in the insert-space 14 by pushing it according to arrow 15. The insert-space 14 includes a shape similar to the data carrier 13. In this preferential form the insert-space is circle shape. When the data carrier is placed in the holder 1, this will be supported on the central area of the data carrier by a thin layer of soft rubbing material 16, like for instance felt. This could be put on by means of a sticker in the insert-space 14. A similar material is also attached nearby the opened end. The strip 17 is also soft and rubbing. The parts 16 and 17 will hold the data carrier to a small distance above the insert-space 14, so the data carrier will not be damaged at the bottom side.

Because the insert-space is formed without obstacles the data carrier 13 can be pushed out of the insert-space 14. The data carrier 13 can be taken out of the holder 1 with one hand, and can be placed in with one hand. By gripping the holder with one hand and turning the holder the data carrier which is placed in the insert-space will move out of the holder. So only one hand is needed to take the data carrier out of the holder.

The data carrier 13 is therefore more manageable and useful for disabled persons, like a one armed person.

Preferably, the insert-space 14 is made slanting in the holder. Clearly shown in FIG. 3, in which a cross-section is shown of the opened state of the holder 1 between line III-III in FIG. 2. The insert-space 14 is higher at the front side of the holder 1 higher than at the backside towards the hinge 10. The insert-space runs slanting down. The supporting surface 17 of the insert-space 14 is placed in a small angle with the bottom side and the top side of the holder 1. In fact we can speak of a Z-figure (bottom side, slanting supporting surface, topside) in which the angles between bottom side and topside are between 1° and 25°, preferential between 2° and 10°. When the holder 1 is placed on a horizontal surface the data carrier 13 will kept in his place by gravity.

When the data carrier 13 is placed in the insert-space 14, as shown in FIG. 3, the data carrier 13 will, at the backside, at the side which is near by the hinge 10 of the cover part 2, gripped by a U- or a C-shape edge 21, which is formed in the holder part 3. The edge 21 is preferably constructed that the edge will grip tightly to the data carrier 13. The edge can be provided of soft grip material which will tightly grip the contour of the data carrier so at least the data carrier 13 will be partly prevented from falling out of the holder 1. The insert-space 14 includes an edge 21 which grips at least less than half of the contour of the data carrier 13. The edge 21 can also have a small arch corner, for instance 120°. In another preferential design the edge 21 can be formed by more smaller parts. In one design the insert-space 14 is formed bigger than the thickness of the data carrier. The data carrier 13 will be lying free in the C-shape edge.

In another preferential design there are clipping means formed instead off the edge. The contour of the data carrier will be put in place in this clip. There can be one or a few clips included.

The cover part 2 includes four (which of 3 are shown) ridges 30, 31, 32, which are made to hold a thin paper material with information underneath the cover. Such ridges are known in regular CD-boxes.

FIG. 2 shows a flexible hook 35, which is put in the holder part 3 at the front side of the holder 1. The hook sticks out above to grip on the groove 36 which is put on at the front side of the cover part 2 and which is shown in FIG. 3. The groove 36 and the flexible hook 35 form together the lock or closing mechanism of the holder 1. In another design there can be put one more lock mechanisms.

The hook 35 can be formed by an integral part of the holder part 3, but can also be a separate part with the holder part connected with a steel hook. One additional advantage of the steel hook 35 is that it will not loose its flexibility, not even by many opening and closing of the holder 1.

Cover part 2 can hinge around axis 10 of the closed state shown in FIG. 1 towards opened state shown in FIGS. 2 and 3. In FIG. 3 there is shown a strip steel material 41 which is put in between cover part 2 and the holder part 3. This steel strip 41 is flexible to take care for pre-stress of the clip in a opened state, for instance the condition shown in FIGS. 2 and 3. In a further preferential design the pre-stressed condition is an open condition, in which the cover part is placed in an angle of 90° with the holder part 3. There can be put in a few metal strips 41 nearby the hinge 10.

When a data carrier is placed in the insert-space 14 and the holder 1 is closed, towards the force of the pre-stressed strip 41, the cover part will with the front end, nearby the lock, push up on the data carrier which is supported by the supporting surface 18. The data carrier will be complete pushed into place. The data carrier is supported by material 17. FIG. 4 shows in more detail the push-button 8 and the backside of the holder 1 This side is the backside of the hinge 10. The push-button 8 is movable according to arrow 42, and runs into the mainly not flexible thread 43, which is tighten between a ridge 44 and a hook 35 of the lock. The non-flexible thread 43 runs over ridges 45 and 46 of the holder part 3, then runs beneath the supporting surface 18 of the insert-space 14, and grips to the hook 35. In the holder part 3 is a space left open in which the thread 43 runs through. The wire will be lead by ridge 45. There is an open space between ridge 45 and ridge 46, in which the push-button is movable. By moving down of the push-button 8 according to arrow 42, hook 35 will move with the thread 43 according to arrow 47 move towards the inside of the holder. In a closed condition hook 35 will grip on groove 36 of the cover part 2. By pushing in push-button 8, the grip will be unlocked, and the cover part will move to pre-stressed condition, under effect of the metal strip 41. Because of that, it is possible to open the box with one hand. In cooperation with the other mentioned advantages the holder for a data carrier can be handled with one hand.

FIG. 4 shows a cross-section of the slanting side 6, formed of a spherical material. The concave form (at the outside) of the material 6 ensure of an enlarging effect when the user look to the information on the outside, of which is in the holder. Specially this information will be shown, when the holder 1 is placed in a rack with a series of insert spaces above each other.

The spherical material 6, in this design, is a separate part fastened between bottom part 7 and holder part 3. Holder part 3 has an edge 48, which grips over the topside of the spherical material.

In FIG. 6 is a second design shown. Spherical material 6 can slide according to arrow 57 in a groove 55 of the holder part then be gripped in that way. Behind the spherical part there will be placed a paper information carrier 53. There will be text shown which will be, by the enlarge effect of the material 54, better readable. By the slanting side the information is also readable by a user which is standing on a distance above the holder.

The paper 53 is supported on a slanting backside of the holder part as shown in the design of FIG. 6.

Bottom part 7 can be placed into the groove 49 of the holder part 3 with the ridge 50 which is at the front side put in to bottom part 7. Bottom part 7 can slide (according to arrow 56 in FIG. 6) into the groove 49. The groove 49 is put in around at least one part of the contour at the bottom side of the holder part 3. The bottom side slides into the holder part from the backside towards the front side. There can be placed a paper information carrier 53 between holder part 3 and bottom part 7. This one will be shown through the bottom part. This construction is much simpler than general holders for, for instance CD's.

Bottom part 7 has mainly the same arch-shape as the holder part 3 and the cover part 2. Bottom part 7 has an L-shape in cross-section as shown in FIG. 3. The short leg 51 of the L-shape forms the upstanding edge, by which the transparent material 6 is put in, when the bottom part 7 is connected to the holder part 3.

The bottom part 7 will be connected to the holder part 3 by means of ridges 52 which stick up from the bottom part 7 toward pick-up spaces are formed in the holder part (not shown). In the design shown in FIG. 6 the ridges stick through the paper information carrier 53.

Of course there are different designs of this invention possible. It is possible to put on a slanting-loading system for data carriers to the holder for data carriers, without the slanting side. Besides that the holder can be designed with the lock system, but without the slanting side.

The invention claimed is:

1. A holder assembly for a data carrier comprising:
   a cover and a holder with an insert-space defined in between the cover and the holder, and
   a back which connects the cover with the holder, wherein at least one part of the back makes an angle between 10° and 80° with the holder and where the holder includes a tight thread connected to at least one hook releasably engagable with the cover and a button that rests upon the thread which when depressed releases the hook,
   wherein the button is located adjacent a hinge axis and a lock is adjacent a front side and opposite the back, wherein the thread connects to the button and to the hook.

2. The assembly according to claim 1, wherein at least part of the back makes an angle between 20° and 70° with the holder.

3. The assembly according to claim 1 wherein the back has a cross-section that is at least partially curved.

4. The assembly according to claim 3 wherein the back side is made of a spherical shaped transparent material.

5. The assembly according to claim 4, wherein the holder further includes at least one edge that cooperates with the spherical shaped transparent material.

6. The assembly according to claim 1, wherein the back is adjacent an axis of the hinge and the back runs parallel to the axis of the hinge.

7. The assembly according to claim 1, wherein the lock is formed by at least one groove formed in the cover and the at least one hook located in the holder where the hook releasably cooperates with the groove.

8. The assembly according to claim 1, wherein that the hook is a flexible material.

9. The assembly according to claim 7, wherein the thread is connected to the hook and button such that using the button results in flexible movement of the hook out of cooperation with the groove.

10. The assembly according to claim 1, wherein the insert-space further includes a curved edge for positioning the data carrier, and a supporting surface for the data carrier where the support surface slants towards the back.

11. The assembly according to claim 10, wherein the supporting surface has an angle between 1° and 20° with reference to a bottom side of the holder.

12. The assembly according to claim 1, wherein the holder will be assembled by a beam shape part and a taco-shape part.

* * * * *